United States Patent [19]
Luria

[11] Patent Number: 5,413,292
[45] Date of Patent: May 9, 1995

[54] VEHICLE CABIN CONSTRUCTION

[75] Inventor: David Luria, Tel Aviv, Israel

[73] Assignee: Fuselage Engineering Services Ltd., Tel-Aviv, Israel

[21] Appl. No.: 121,407

[22] Filed: Sep. 15, 1993

[30] Foreign Application Priority Data

Sep. 18, 1992 [IL] Israel ........................ 103217

[51] Int. Cl.⁶ ..................... B60P 1/64; B60N 3/00; B05G 67/00
[52] U.S. Cl. ....................... 244/118.1; 244/118.6; 186/47; 105/327; 414/392; 414/399; 410/69
[58] Field of Search ............... 244/118.1, 118.5, 118.6; 186/47, 51; 105/327; 414/392, 399, 282, 283; 410/69; 198/465.1, 465.2

[56] References Cited

U.S. PATENT DOCUMENTS

| 3,517,899 | 6/1970 | Vernon | 105/327 |
|---|---|---|---|
| 3,642,158 | 2/1972 | Koenecke et al. | 198/465.1 |
| 3,741,504 | 6/1973 | Alberti et al. | 410/69 |
| 4,022,404 | 5/1977 | Greiss | 244/118 R |
| 4,066,227 | 1/1978 | Buchsel | 244/118.1 |
| 4,234,278 | 11/1980 | Harshmann et al. | 410/69 |
| 4,349,302 | 9/1982 | Ferguson | 410/69 |
| 4,648,570 | 3/1987 | Abdelmaseh et al. | 244/118.1 |
| 4,660,787 | 4/1987 | Sprenger et al. | 186/47 |
| 4,925,132 | 5/1990 | Zider | 244/118.1 |
| 4,966,513 | 10/1990 | Motoda | 414/399 |
| 5,074,496 | 12/1991 | Rezag | 105/327 |
| 5,123,517 | 6/1992 | Windau | 198/465.2 |
| 5,159,994 | 11/1992 | Luria | 244/118.5 |
| 5,205,515 | 4/1993 | Luria | 244/118.5 |
| 5,314,143 | 5/1994 | Luria | 198/465.1 |

FOREIGN PATENT DOCUMENTS

| 2148355 | 4/1973 | Germany | 414/282 |
|---|---|---|---|
| 4029628 | 10/1991 | Germany | 244/118.5 |

Primary Examiner—Andres Kashnikow
Assistant Examiner—Virna Lissi Mojica
Attorney, Agent, or Firm—Benjamin J. Barish

[57] ABSTRACT

A vehicle cabin construction includes a storage Compartment in the space between the ceiling and outer cabin wall extending longitudinally of the vehicle cabin for storing article holders, an elevator for lowering the article holders from the storage compartment to the deck, and for raising the article holders from the deck to the storage compartment, and longitudinal transfer means engageable with the article holders for moving them longitudinally from or to different locations in the storage compartment on a plurality of roller transfer members.

21 Claims, 15 Drawing Sheets

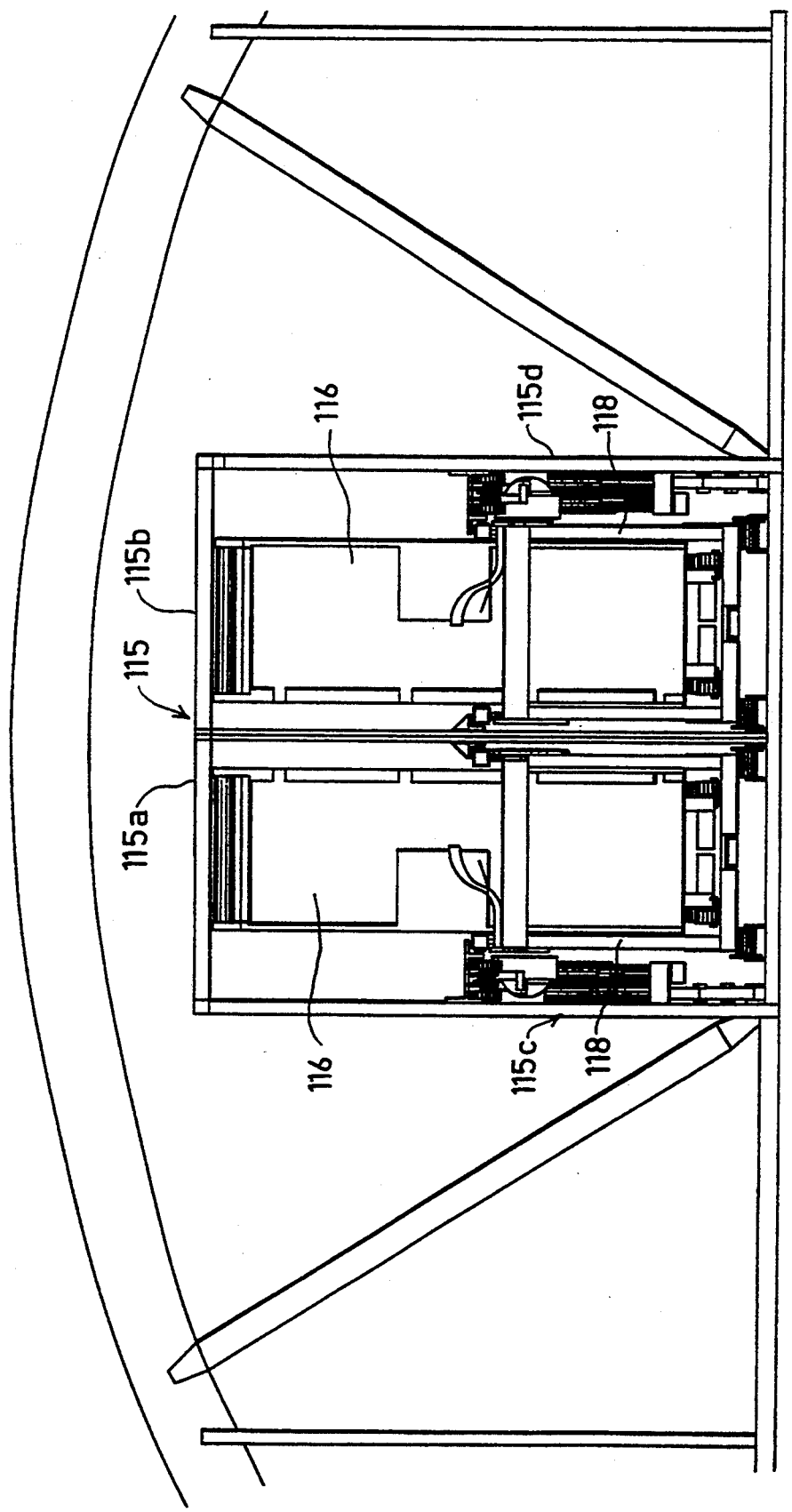

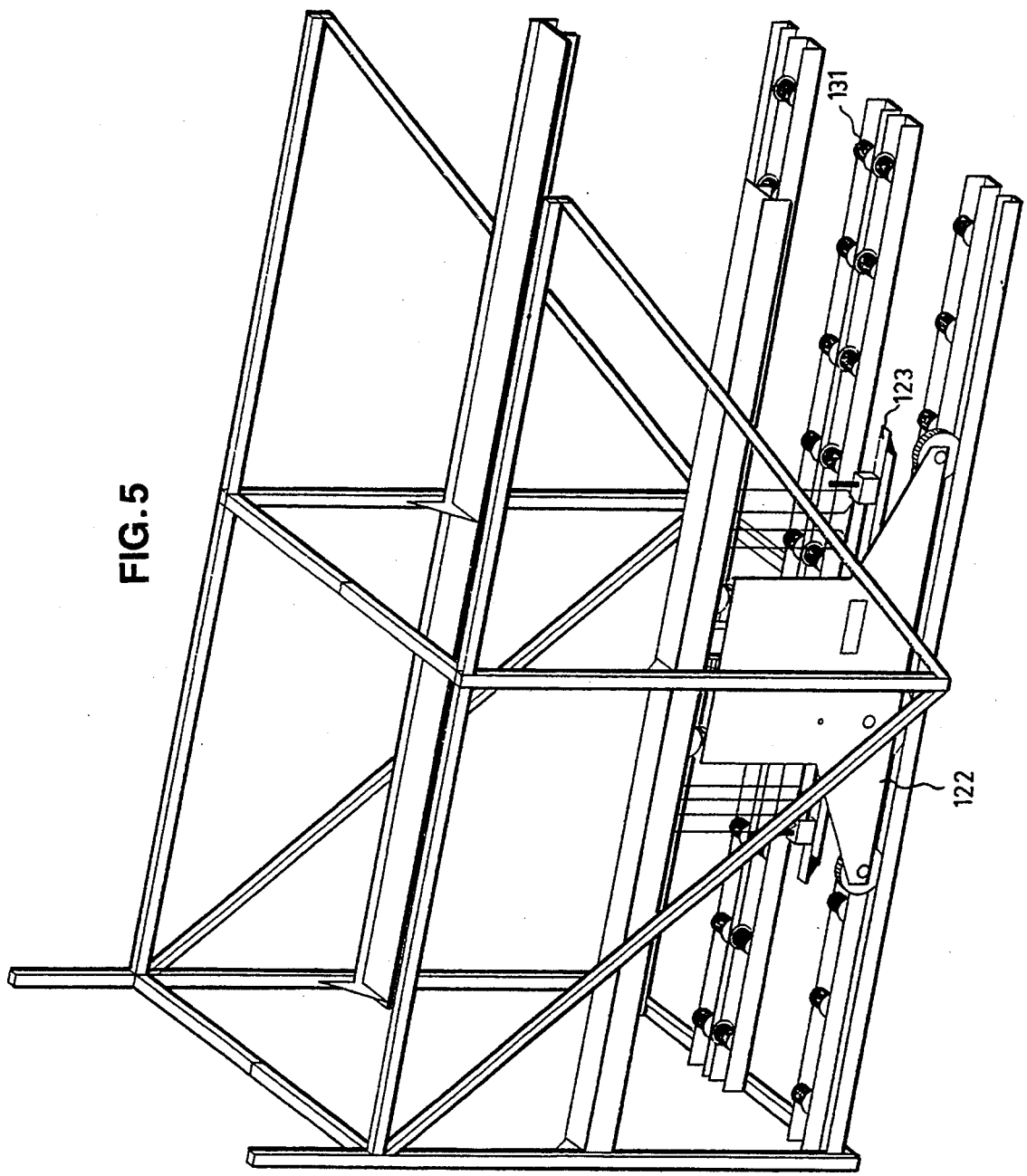

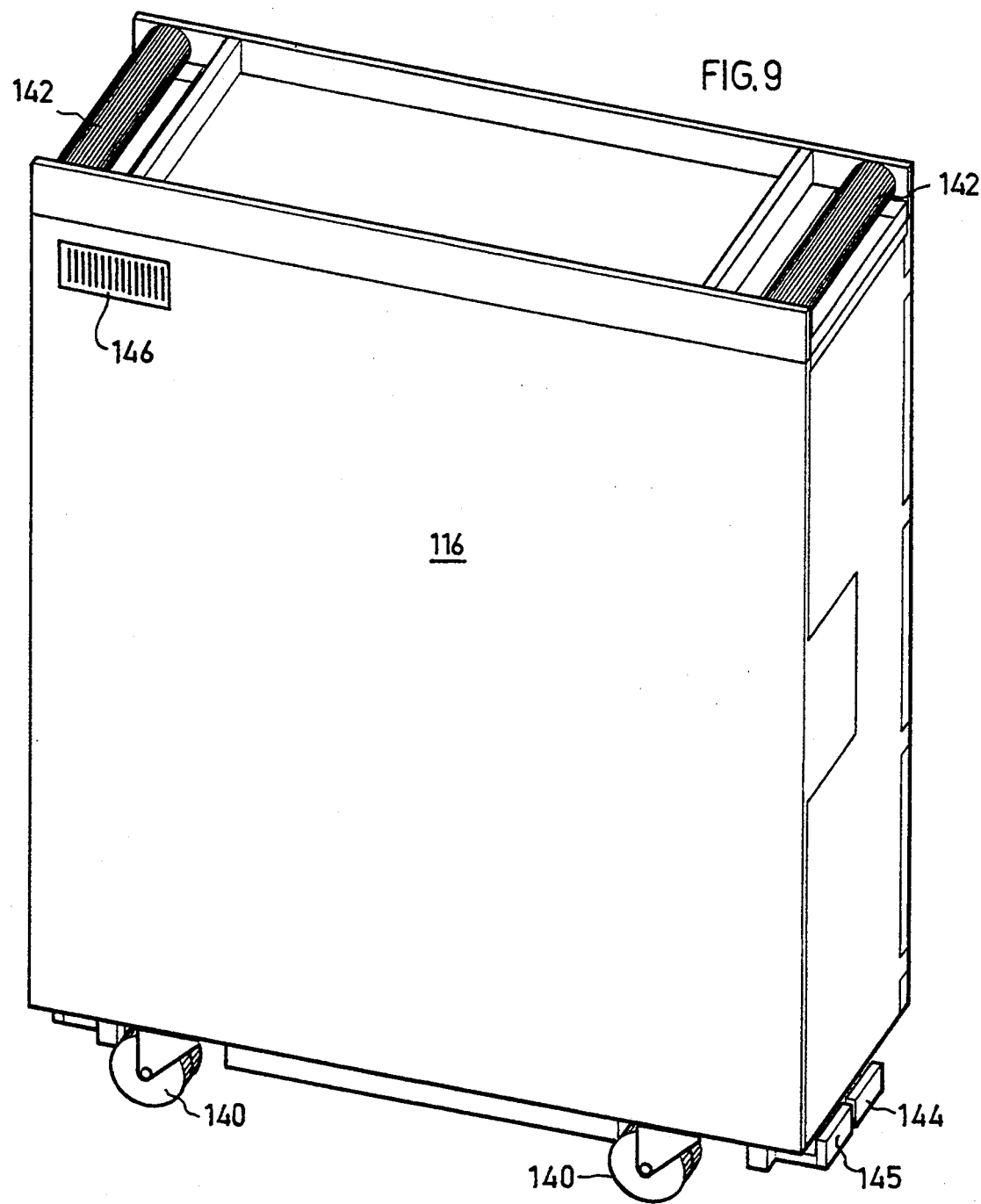

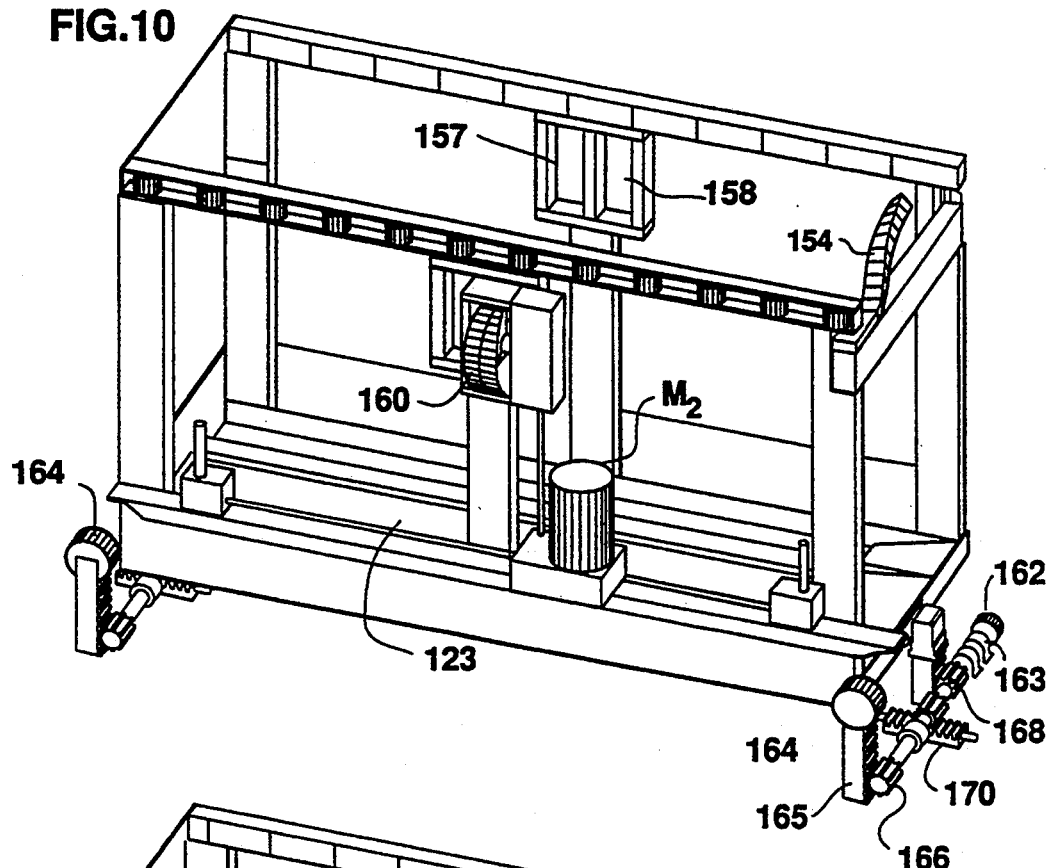
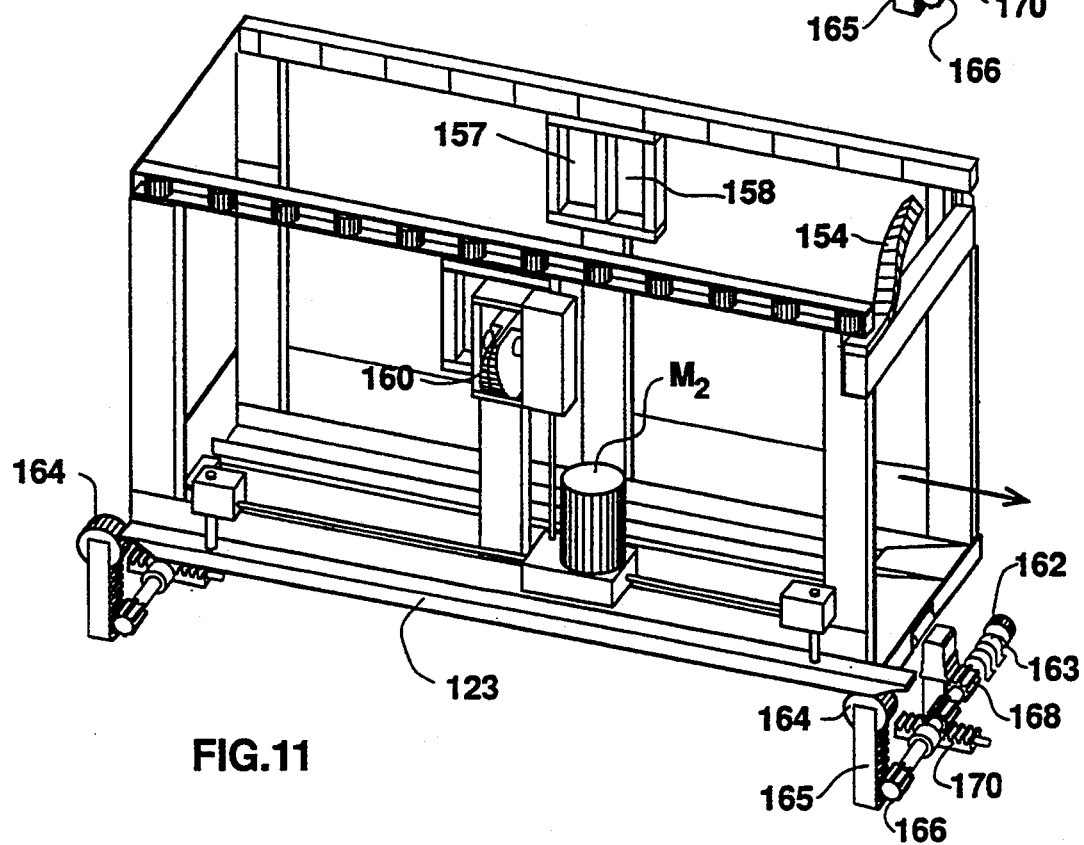

VEHICLE CABIN CONSTRUCTION

RELATED APPLICATIONS

The present application is related to my application Ser. No. 08/059,716, filed May 12, 1993, now U.S. Pat. No. 5,314,143 of May 24, 1994, (which is a continuation of application Ser. No. 07/812,461, filed Dec. 23, 1991, now abandoned), and also application Ser. No. 07/812,466, filed Dec. 23, 1991, now U.S. Pat. No. 5,205,515.

FIELD AND BACKGROUND OF THE INVENTION

The present invention relates to a vehicle cabin construction, and particularly to a passenger vehicle construction which efficiently exploits the unused space within the vehicle such as to enable the cabin to accommodate additional passenger seats. The invention is especially useful for aircraft, and is therefore described below with respect to such application.

The invention of the present application is particularly useful with respect to the constructions described in the above-identified patent application Ser. Nos. 08/059,716, (now U.S. Pat. No. 5,314,143), and 07/812,466, (now U.S. Pat. No. 5,205,515). Those patent applications describe several aircraft cabin constructions for increasing the use of floor space in the passenger cabin of the aircraft in order to increase the seating capacity and thereby to increase operating revenue. The descriptions of the above two patent applications are herein incorporated by reference.

Patent application Ser. No. 08/059,716 and 07/812,466 describe aircraft cabin constructions comprising an outer fuselage wall enclosing a passenger compartment including a ceiling spaced below the outer fuselage wall, a deck below the ceiling, and a plurality of passenger seats fixed to the deck under the ceiling; characterized in that the cabin construction further includes: a storage compartment in the space between the outer fuselage wall and the ceiling for storing article holders; and an elevator having a platform and a drive for loading the article holders from the storage compartment to the deck, and for raising the article holders from the deck to the storage compartment.

In one described embodiment in patent application Ser. No. 08/059,716, the storage compartment occupies the space extending along the longitudinal axis of the aircraft cabin between the outer fuselage wall and the ceiling. The present application is particularly directed to the latter embodiment.

OBJECTS AND BRIEF SUMMARY OF THE INVENTION

Thus, according to the one aspect of the present invention, the storage compartment includes a bottom wall rotatably mounting a plurality of roller transfer members such that the members project outwardly from the upper surface of the bottom wall so as to rotatably engage the article holders when received within the storage compartment; and longitudinal transfer means engageable with the article holders for moving them longitudinally from or to different locations in the storage compartment on the plurality of roller transfer members.

The present invention, as well as that described in application Ser. No. 08/059,716, is particularly useful in passenger aircraft when the article holders are food-serving wheeled carts. In such cases, each cart is received within a cart carrier such that the carts are not supported in the storage compartment on their own wheels, but rather they are carried by carriers which are in turn supported on the roller transfer members projecting from the upper surface of the bottom wall of the storage compartment. Thus, in the construction described in application Ser. No. 08/059,716, the jamming of a cart wheel may completely block the cart storage compartment. However, in the novel construction of the present application, this is less likely to occur since the carts are not moved on their own wheels, but rather on the transfer members projecting from the bottom wall of the storage compartment and engageable with the cart carriers.

According to further features in the preferred embodiment of the invention described in the present application, the storage compartment is in a framework having a center section defining two storage compartments for accommodating two longitudinal lines of article holders (e.g., the cart carriers), and a side section on each of the outer sides of the center section. There are a plurality of the longitudinal transfer means in each of the side sections for transferring the article holder longitudinally of the respective cart storage compartment. The cabin construction further includes transverse transfer means for transferring the article holders from one storage compartment to the other. Such a construction provides a compact arrangement for accommodating and moving the article holders (e.g., the cart carriers and their carts) as required especially in an aircraft.

Further features and advantages of the invention will be apparent from the description below.

BRIEF DESCRIPTION OF THE DRAWINGS

The invention is herein described, by way of example only, with reference to the accompanying drawings, wherein:

FIG. 4 is an enlarged transverse sectional view illustrating the framework defining the cart storage compartments;

FIG. 5 is a perspective view illustrating the structure of the longitudinal transfer sections of the storage compartments;

FIG. 9 is a perspective view illustrating one of the carts itself;

FIGS. 10 and 11 are perspective views illustrating the manner in which each cart carrier is transferred longitudinally in the cart storage compartment;

DESCRIPTION OF PREFERRED EMBODIMENTS

Figure 1:
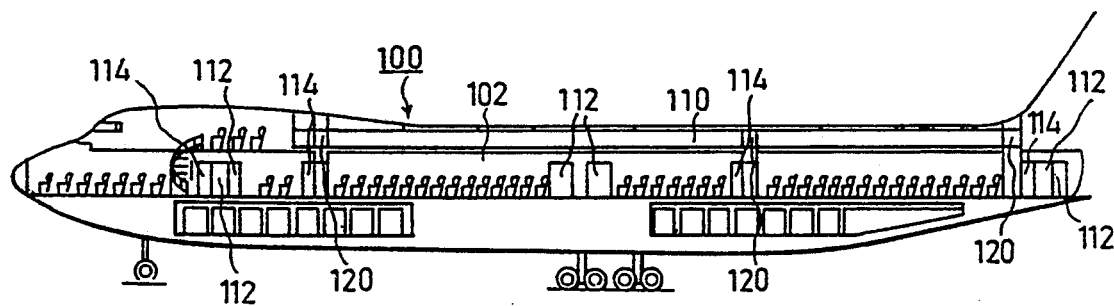
FIG. 1 is a longitudinal sectional view illustrating one form of aircraft cabin construction in accordance with the present invention.
Figure 2:
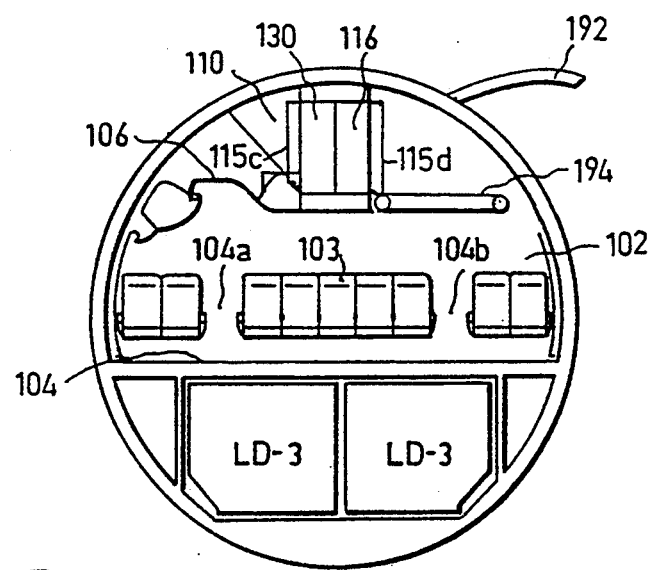
FIG. 2 is an enlarged transverse sectional view of the cabin construction of FIG. 1.
Figure 3:
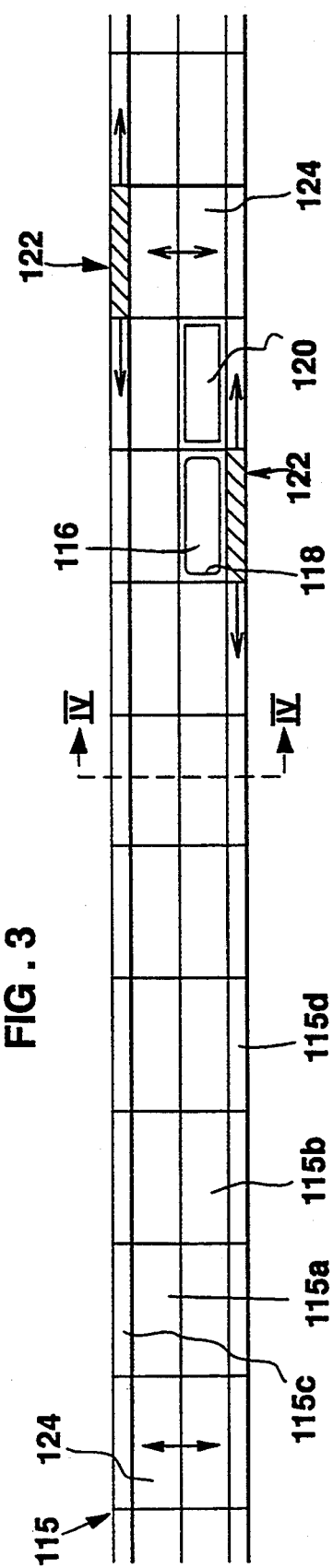
FIG. 3 is a diagrammatic top view of the cart storage compartments in the cabin construction of FIGS. 1 and 2.

With reference first to FIGS. 1–4, there is illustrated an aircraft fuselage construction, generally designated 100, including a passenger compartment 102 having seats 103 fixed to the passenger deck 104 and defining two longitudinally-extending aisles 104a, 104b, as well as a plurality of transversely-extending entrance/exit aisles (not shown). The passenger compartment includes a ceiling 106 which is spaced from the outer fuselage wall 108 to define a longitudinally-extending space 110 between them. The illustrated aircraft further includes lavatories 112 and galleys 114 also covered by ceiling 106 and spaced from the outer fuselage wall 108.

The longitudinally-extending space 110 receives an open framework, generally designated 115, defining two storage compartments 115a, 115b for storing two lines of article holders, in this case, wheeled carts 116 each carried by a cart carrier 118. As shown particularly in FIGS. 2–4, the two compartments 115a, 115b are in a central section of the framework. The framework further includes two side sections 115c, 115d, on the outer sides of the two compartments 115a, 115b for accommodating the transfer mechanism for transferring the carts and their carriers both longitudinally and transversely of the framework with respect to a plurality of elevators 120 (FIG. 1) spaced longitudinally of the framework. Thus, FIG. 1 illustrates three elevators 120 located at spaced locations along the length of the framework 115. Framework 115 may extend for the complete length of the passenger compartment 102, or for only a part of its length.

FIG. 5 illustrates the longitudinal transfer mechanism accommodated in the two outer side sections 115c, 115d, of the open framework 115. Each longitudinal transfer mechanism includes a plurality of (e.g., three) carriages 122, and a drive for moving a selected carriage, together with the cart carrier 118 to which is coupled, longitudinally of the cart storage compartment. Each carriage 122 is driven by a motor $M_1$ (FIG. 15) mounted on the carriage. Each carriage 122 also supports an actuator bar 123 which is moved longitudinally with the carriage, but which may also be driven by a second motor $M_2$ (FIG. 15) to an upper inoperative position or to a lower operative position when a cart, with which the carriage 122 is aligned, is to be longitudinally conveyed by the carriage, as will be described more particularly below. Motor $M_2$ also drives a coupling mechanism, as will also be described below, to selectively couple the carriage to the cart carriers 118.

Figure 6:
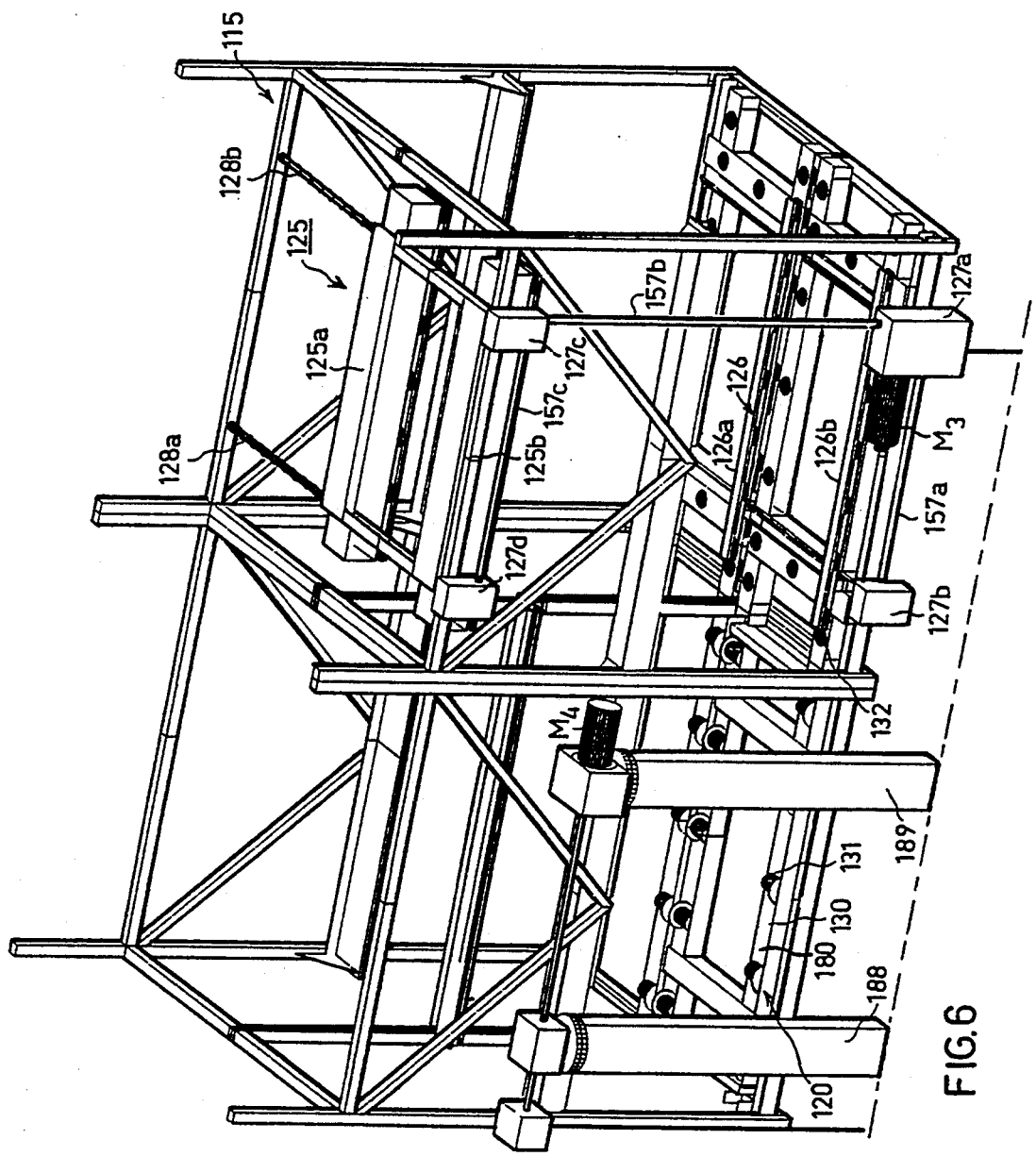
FIGS. 6 and 7 are perspective and ends views, respectively, particularly illustrating the structure of the transverse transfer sections of the storage compartments.

At spaced locations 124 (FIG. 3) of the two cart storage compartments 115a, 115b, there is provided a transverse transfer mechanism for moving the carrier and its cart transversely from one line to the other. Thus, as shown in FIG. 6, the transverse transfer mechanism includes an upper open frame 125 including a pair of parallel bars 125a, 125b adapted to straddle the upper end of the cart to be moved transversely, and a lower frame 126 including a pair of bars 126a, 126b adapted to straddle the lower part of the cart carrier. The two frames 125, 126 are moved together in the transverse direction by a motor $M_3$ coupled, via transmission members 127a, 127b, 127c and 127d, to a pair of screws passing through the upper frame member 125, and a similar pair of screws (not shown) passing through the lower frame member 126, such that both frame members are moved together in the transverse direction.

As shown particularly in FIG. 6, the open framework 115 includes a bottom wall 130 mounting a plurality of roller transfer members 131 and 132 projecting outwardly from the upper surface of the bottom wall 130 so as to be rotatably engageable with the bottom walls of the cart carriers 118 in the storage compartments. Roller transfer members 131 in the longitudinal transfer sections of the framework 115 are of cylindrical configuration so as to permit the cart carriers 118 to be moved longitudinally of the respective storage compartment. Rollers 132 at the transverse transfer sections of the framework, however, are of spherical configuration so as to permit the cart carriers to be moved transversely and longitudinally.

The upper frame member 125 of the transverse transfer mechanism includes two lines of rollers 133 (FIG. 7) rotatably mounted about vertical axes and engageable with the upper surfaces of the carts 116. Similarly, the lower frame member 126 of the transverse transfer mechanism includes two lines of rollers 134 engageable with the lower faces of the cart carriers 118. The cart carriers 118 carry two further lines of rollers 135 on their upper ends engageable with frame member 136 when a cart and its carrier have been transferred to storage compartment 115a, or with frame member 137 when a cart and its carrier have been transferred to the other storage compartment 115b.

Each of the carts 116 is provided with four wheels 140 (FIG. 7) at its lower end for wheeling the cart along the aisle when distributing the food carried in the cart. However, when the cart 116 is within the cart storage compartments 115a, 115b, the wheels 140 merely support the cart within the respective carrier 118 of the cart, and do not engage the bottom wall 130 of the cart storage compartments; rather, the bottom wall of the carrier 118 is supported on the roller transfer members 131 and 132 projecting from the bottom wall 130 of the cart storage compartments. The transfer members 131 and 132 thus permit transferring the carts, together with their carriers, in both the longitudinal direction (on roller member 131) as well as in the longitudinal and transverse directions (on roller members 132) with respect to the storage compartments, with less chance that a cart will become jammed within the storage compartments 115a, 115b during the movements of the carts and their carriers therein.

Figure 8:
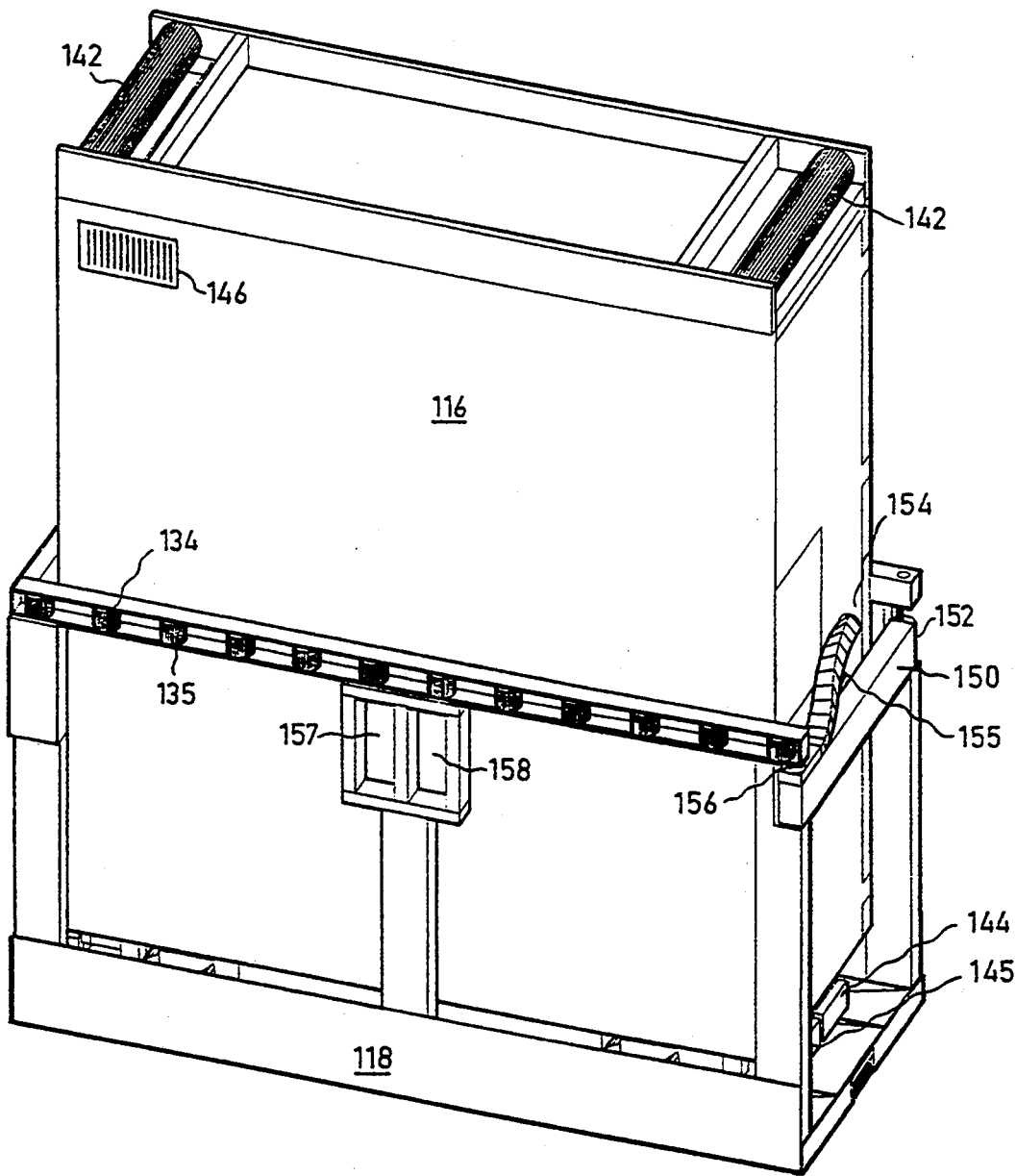
FIG. 8 is a perspective view illustrating one of the cart carriers, and the cart carried thereby, to be received in the cart storage compartment.

Each cart 116 further includes a pair of handles 142 at its opposite ends to facilitate pushing or pulling the cart along the aisle. Each cart may also be provided with a pair of brake pedals 144, 145 (FIG. 8), one of which is foot-depressed in order to brake the cart, and the other of which is foot-depressed to release the brake. Each cart may be further provided with a bar code 146 (FIG. 8) at the upper end of its side wall for purposes of identifying the cart and/or the food held therein.

The cart carriers 118 are open at their upper ends for receiving the carts 116. Each carrier 118 includes a locking bar 150 at its upper end pivotally mounted at one side 152 from an open position, allowing the cart to be rolled into the carrier, or to a closed position (shown in FIG. 8) for locking the cart within the carrier. Locking bar 150 carries a handle 154 which may be grasped by the user, together with a releasing element 155, and pivoted about a pin 156 at the opposite side of the locking bar, for locking and securing bar 152 in its closed position.

Each carrier 118 is further formed with a pair of rectangular openings 157, 158, at the upper end of its side walls. These rectangular openings 157, 158 are adapted to receive coupling devices carried by the carriages 122 for transferring the carriers, and their carts, longitudinally of their respective cart storage compartments 115a, 115b.

The coupling device carried by each carriage 122 is in the form of a rotary cam 160 which is rotated either to a projecting, coupling position, projecting into one of the openings 157, 158, in the cart carrier 118 with which it is then aligned, or to a retracted, released position, removed from the respective opening. Thus, one of the openings 157 receives the coupling cam 160 when the carriage 122 is moved in one direction in order to transfer the cart carrier in that direction, and is received in the other opening 158 when its carriage is moved in the opposite direction. FIGS. 13a–13d illustrate the movement of the coupling cam 160 when moved from its released position (FIG. 13a) to its finally coupled position (FIG. 13d) with respect to opening 157 in the cart carriage 118.

Each of the cart storage compartments 115a, 115b includes a plurality of stops 162 spaced along its length such as to provide a pair of stops on opposite sides of each cart carrier. As shown particularly in FIG. 12, each stop 162 is biassed by a pair of leaf springs 163 to an operative (upper) position engageable with the end of the cart carrier. Each stop 162 further includes an individual actuator, in the form of a roller 164 carried at the upper end of a rack 165, which is engageable by the carriage bar 123, to move the stop to a retracted (lower) position, disengageable with the respective end of the cart carrier. Thus, as shown particularly in FIG. 12, when roller 164 is depressed, by its engagement with the carriage bar 123 (as will be described more particularly below with respect to FIG. 15), rack 165 is moved downwardly, and transfers its downward movement to stop 162 via gear 166 meshing with rack 165, shaft 167, gear 168 secured to the latter shaft, and rack 169 carried by stop 162. FIG. 10 illustrates the stop 162 is in its upper blocking position to which it is biased by the leaf springs 163, and FIG. 11 illustrates the stop in its lowered unblocking position enabling the cart carrier 18 to be moved in the direction shown by the arrow.

Figure 12:
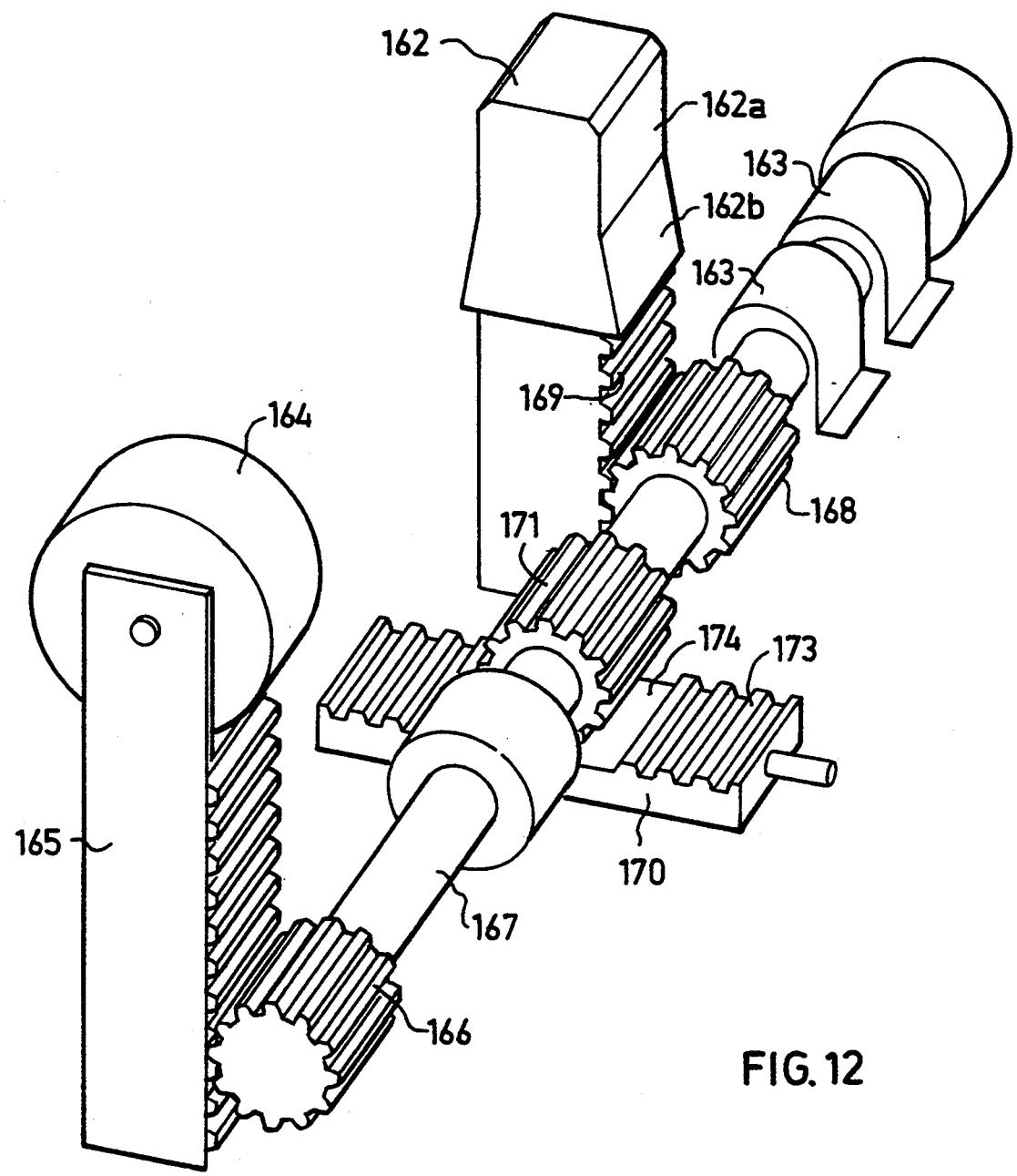
FIG. 12 is a perspective view illustrating the locking and releasing mechanism for locking and releasing each cart carrier.
Figure 13D:
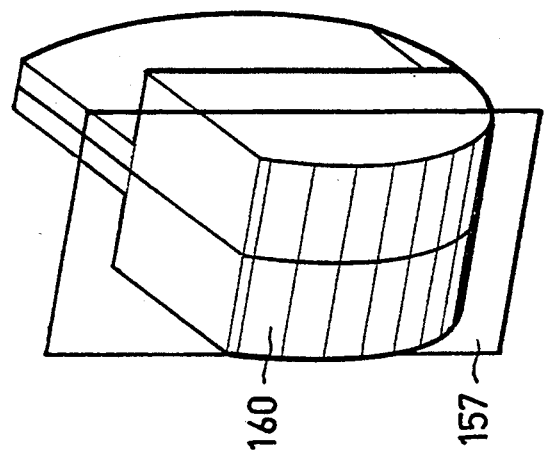
FIGS. 13a–13d illustrate various stages of the coupling device for coupling a cart carrier to the longitudinal transfer mechanism.
Figure 13C:
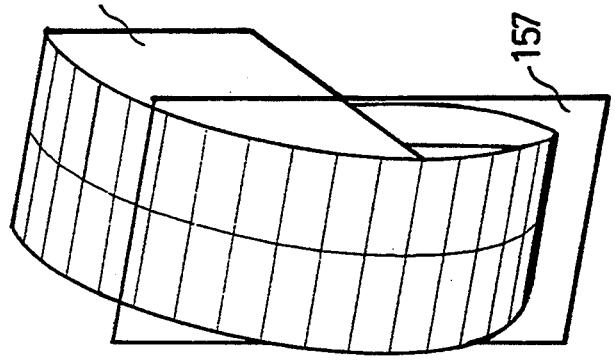
Figure 13B:
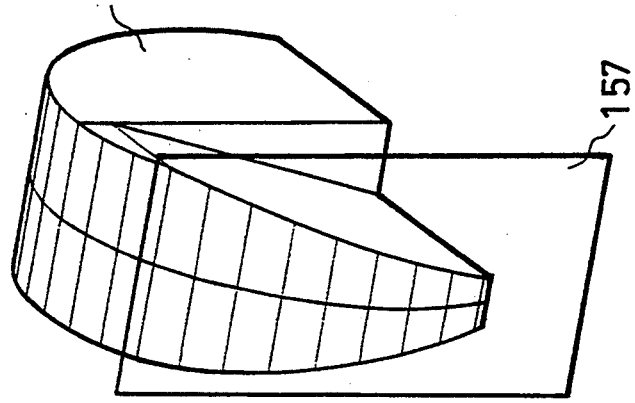
Figure 13A:
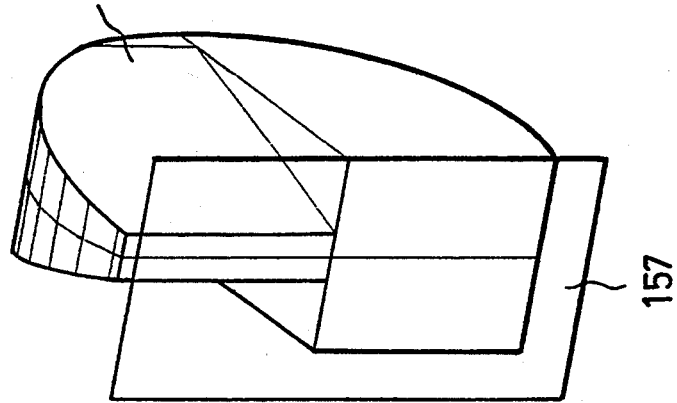

All the stops 162 in the respective cart storage compartment 115a or 115b may also be actuated simultaneously by a common actuator, in the form of a rack 170 extending longitudinally of the respective cart storage compartment. Thus, as shown in FIG. 12, the common actuator rack 170 is cooperable with a further gear 171 secured to the shaft 167 for each of the stops 162. For each stop 162, the common actuator rack 170 includes a first toothed section 172 and a second toothed section 173 spaced therefrom by an untoothed section 174. Thus, when the common actuator rack 170 is moved in one direction (e.g., rightwardly in FIG. 12), its toothed sections 172 engages the gears 171 of the shafts 167 for all the stops 162, to rotate all the shafts counter-clockwise, and thereby to lower all the stops simultaneously; and when the common actuator rack 170 is moved in the opposite direction (leftwardly in FIG. 10), it rotates the shafts 167 for all the stops 162 clockwise to move all the stops 162 to their upper operative positions. When the rack has completed either of such movements, it locks the shafts 167, and thereby all the stops 162.

In order to unlock the stops 162 for individual movement by their rollers 164 and racks 165, the common actuator rack 170 is moved to align its untoothed sections 174 with the gears 171 of all the shafts 167. The gears 171 of all the shafts 167 therefore do not mesh with any of the teeth in the common actuator rack 170, and thereby permit their shafts 167, and the stops 162 actuated thereby, to be rotated in one direction by the depression of roller 164 to depress its respective stop 162, or by the bias of its leaf springs 163 to rotate the shaft 167 in the opposite direction to raise the respective stop 162.

As shown particularly in FIG. 12, each stop 162 includes an upper section 162a and a thicker base section 162b having diverging (in the downward direction) inclined walls. When the stop is moved to its upper operative position by its biasing springs 163, the upper section 162a engages the cart carrier to block the movement of the cart; but the stop may be moved by the common actuator rack 170 to a higher secured operative position, wherein its base section 162b engages the cart carrier. The inclined walls of the base section 162b more securely hold the cart carrier against movement.

Figure 14:
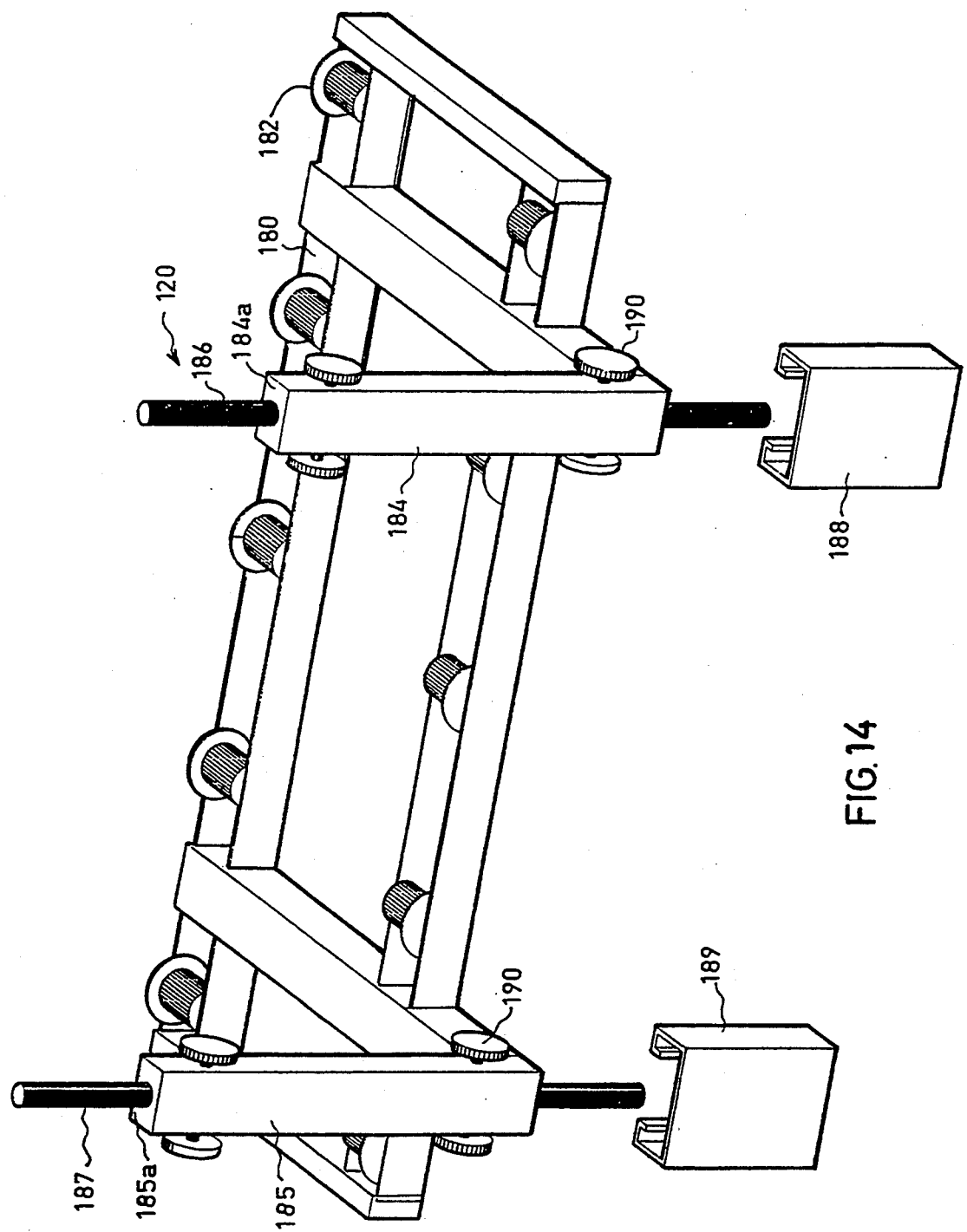
FIG. 14 is a perspective view illustrating the elevator mechanism in the described cabin construction.

FIG. 14 particularly illustrates the construction of each of the elevators 120. As indicated earlier and as illustrated in FIG. 1, there are three such elevators 120 spaced longitudinally of the aircraft cabin each in alignment with a storage position of one of the storage compartments 115a, 115b. Each elevator 120 lowers the cart carrier 118, including its respective cart 116, from the respective cart storage compartment, 115a or 115b, to the passenger deck 104, or raises it from the passenger deck to the storage compartment.

Thus, as shown in FIGS. 6 and 14, each elevator 120 includes a frame member 180 aligned with the bottom wall 130 of the respective storage compartment 115a or 115b. Frame member 180 includes a plurality of rollers 182 engageable with the bottom wall of the cart carrier 118 to permit its transfer to the frame member. Frame member 180 is supported by a pair of sleeves 184, 185 at its opposite ends having threaded openings in their end walls 184a, 185a, threadedly receiving screws 186, 187, such that the rotation of the screws in one direction raises the frame member 180 and the cart carrier supported thereon, and rotation of the screws in the opposite direction lowers the frame member and the cart carrier thereon.

Sleeves 184, 185 are of rectangular section and are received within vertical posts 188, 189 fixed to the open framework 115 defining the two cart storage compartments 115a, 115b. The two sleeves 184, 185 are further provided with external rollers, as shown at 190, engageable with the inner faces of the vertical posts 188, 189 to guide the movement of the sleeves as the screws 186, 187 are rotated.

The cart storage and handling system illustrated in the drawings is used in the following manner.

Each cart 116, carrying the food to be distributed to the passengers, is received within one of the carriers 118, by opening the locking bar 152 (FIG. 8) of the respective carrier and wheeling the cart into the open end of the carrier. The carriers 118 containing the carts 116 are then loaded into the two cart storage compartments 115a, 115b defined by the open framework 115 extending longitudinally of the passenger compartment 102, between the ceiling 106 and the outer fuselage wall 108, as particularly illustrated in FIGS. 1 and 2. The elevators 120 are used for thus loading the carts and their carriers into the cart storage compartments 115a, 115b. Alternatively, the cabin may have a special door, shown at 192 in FIG. 2, providing access to a transverse conveyor 194 extending along one side of the storage compartments 115a, 115b, to provide for quick ground loading and unloading of the carts and their carriers, or other types of article holders.

When the aircraft is on the ground, the common actuator rack 170 (FIG. 12) for each of the cart storage compartments 115a, 115b, may be moved in the rightward direction in FIG. 12, to cause its toothed sections 172, meshing with the gears 171 for all the stops 162, to rotate the shafts 167 for all the stops counter-clockwise, thereby lowering all the stops 162 to their lowered, inoperative positions. This facilitates quick loading and/or unloading of the cart carriers with respect to their storage compartments 115a, 115b. When the aircraft is taking off, the common actuator rack 170 would be actuated in the leftward direction, to cause its toothed sections 173 to engage gears 171 and thereby to rotate the shafts 167 of all the stops 162 clockwise. This raises all the stops 162 to their operative positions and to lock them in such positions, so as to securely block the cart carriers from any movements in their respective storage compartments 115a, 115b. In this secured position of the stops 162, they are raised such that the inclined faces of their wider base sections 162b engage the cart carriers 118, and thereby securely hold the carriers from any movement.

At all other times, the common actuator 170 would normally be actuated to align its untoothed sections 174 with gears 170 of the shaft 167 for all the stops 162, thereby disabling the common actuator rack 170 from actuating the stops 162. In this condition of the common actuator rack 170, the leaf springs 163 bias the shafts 167 of all the stops 162 to their upper, operative positions, engageable with the ends of the cart carriers, but are not secured in these upper positions; rather, they are individually depressible to their lower positions by the engagement of the carriage bar 123 with their respective rollers 164.

When the carts 116 are to be used for distributing their food contents to the passengers, they and their carriers 118 are individually transferred to the nearest elevator 120 by means of the longitudinal transfer mechanism including the carriages 122, and also the transverse transfer mechanism including the transfer members 125, 126 (FIG. 6) at the upper and lower ends of the framework 115. This operation, as shown schematically in FIG. 15, is performed as follows:

One of the carriages 122 for the respective storage compartment 115a, 115b, is moved longitudinally by its motor $M_1$ until the cam 160 of the carriage is aligned with the opening, 157 or 158, of the selected cart carrier 118 facing the direction in which the carrier is to be moved. Thus, with reference to FIG. 8, if the cart carrier is to be moved leftwardly, cam 160 would be aligned with opening 157, and if it is to be moved rightwardly, the cam would be aligned with opening 158. When the cam is so aligned with the proper opening of the carrier to be moved, motor $M_2$ (FIG. 15) is energized to rotate the cam coupling device 160 to its projected position (FIG. 13) to project into opening 157 (or 158) of the selected cart carrier 118. Motor $M_2$ also lowers the carriage bar 123 to cause it, after cam 160 has moved into the aligned opening, 157 or 158, to engage the roller 164 to lower its stop 162 on the side of the carrier in the direction to which the carrier is to be moved. Motor $M_1$ is then energized to move the carriage 122, and the cart carrier coupled thereto by the cam coupling device 160, longitudinally of the respective cart storage compartment 115a or 115b.

Figure 15:
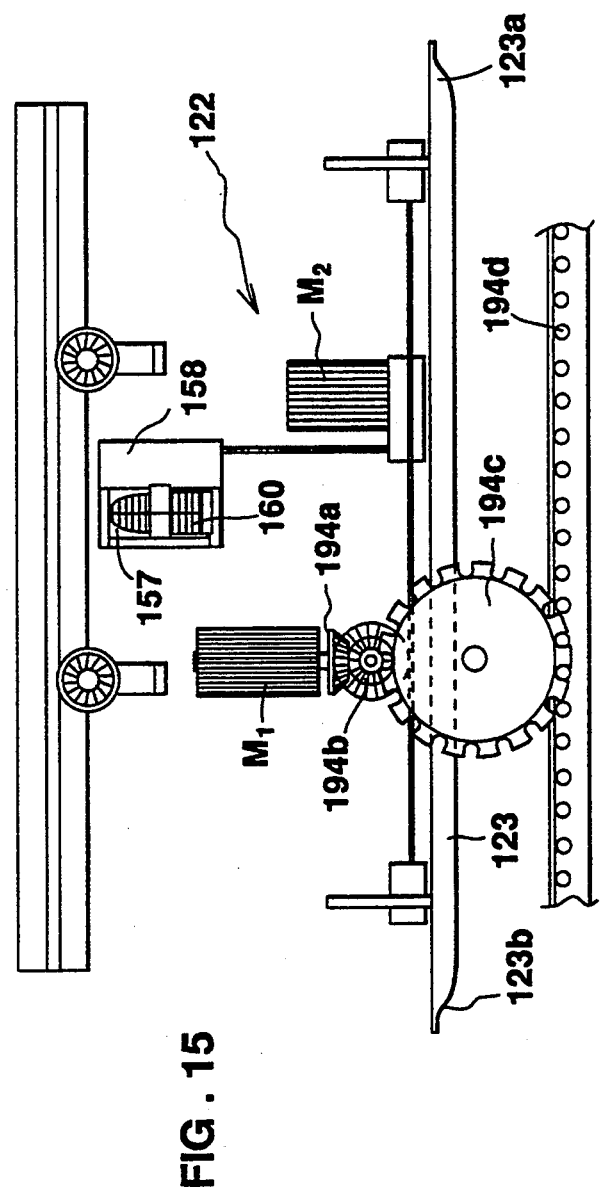
FIG. 15 diagrammatically illustrates the longitudinal transfer mechanism and the drives therefor.

As shown in FIG. 15, carriage 122 for each of the cart storage compartments 115a, 115b, is moved within its respective side section 115c or 115d longitudinally of the respective cart storage compartment by means of drive motor $M_1$ which is coupled to the carriage 122 via gearing 194a, 194b and sprocket wheel 194c, carried by the carriage, and roller chain 194d fixed in the lower side sections 115c, 115d and extend along the length of the storage compartment. The opposite ends of the carriage bar 123 are inclined, as shown at 123a, 123b, so that when either end engages the rollers 164 for the stops 162 during the travel of the carriage longitudinally of the cart storage compartment, the carriage bar sequentially depresses the rollers 164 and thereby the stops 162 coupled to them via rack 165 (FIG. 12), gear 166, shaft 167, gear 168 and rack 169 for each stop 162.

Whenever it is desired to move a selected cart carrier transversely, from one cart storage compartment (e.g., 115a) to the other (e.g., 115b), this is done by energizing motor $M_3$ (FIG. 6), to move, via transmission 127a–127d, shafts 157a–157c, and the feed screws 128, the two transverse transfer members 125, 126 in the transverse direction, thereby moving the cart carrier transversely of the framework 115.

When a cart carrier has been transferred to the elevator platform bar 180, the elevator motor $M_4$ (FIG. 6) is energized to rotate the screw feeders 186, 187 (FIG. 14), and thereby to move the two sleeves 184, 185 downwardly to bring the cart carrier 118 to the aircraft deck 104. Handle 154 of the cart carrier is then pivoted to open the locking bar 150, enabling the cart 116 to be wheeled out of the carrier and onto the deck.

It will be seen that the above construction operates in a "fail safe" manner. Thus, the stops 162 are always in their upper operative positions to block any movement of the cart carriers except when the carriage 122 has actually been coupled to a cart carrier by the cam coupling device 160. The latter device projects its cam into the appropriate opening 157 or 158 of the cart carrier, and thereby positively couples the cart carrier to the carriage, before the carriage bar 123 lowers the stop 162 for the respective carrier.

The carriage bar 123 is of a length such that when the carriage aligns its cam coupling device 160 with the opening 157 or 158 of the selected carrier at the side thereof corresponding to the direction in which the carrier is to be moved, the carriage bar will engage the roller 164 for the stop 162 at that side of the carrier (i.e., in the direction in which the carrier is to be moved), but will not engage the roller 164 for the stop 162 at the opposite end of the carrier, so that the carrier can move only in the intended direction. As the cart carrier is moved by the carriage longitudinally of its respective storage compartment, the carriage bar 123 (being in its lowered position) successively engages the rollers 164 to thereby lower their respective stops 162 in the direction of movement of the carrier, while disengaging the rollers 164 at the opposite end of the carriers so as to prevent any rear movement of the carriers. Further, when all the carriers are to be securely locked against movement, e.g., during take-off, the common actuator rack 170 is actuated to move all the stops 162 to their secure blocking position with the inclined faces of the wide base sections 162b of the stops engageable with the cart carriers.

Figure 7:
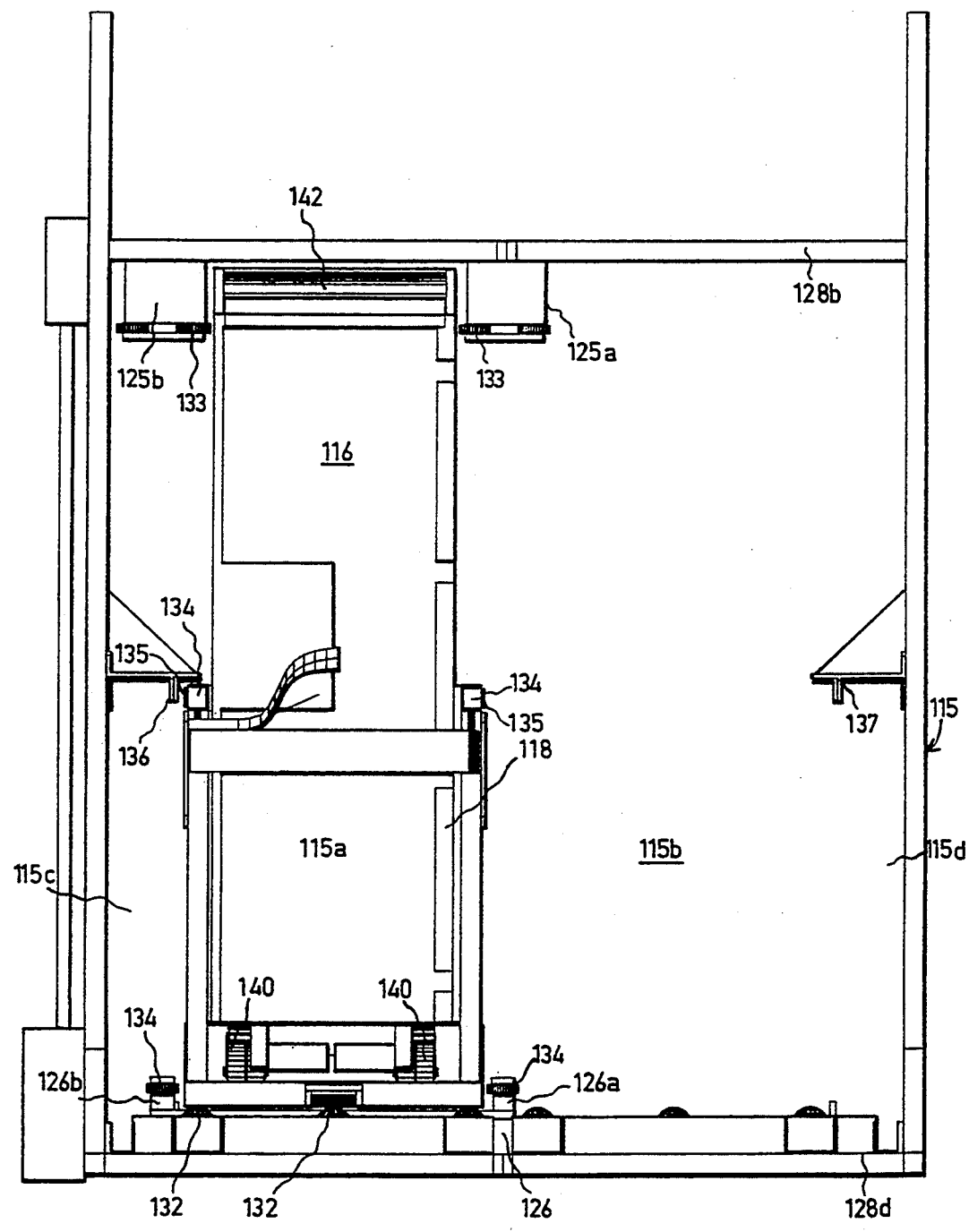

After the food carried by the cart 116 has been distributed, the cart may be wheeled back onto its carrier 118, and the carrier returned to the respective cart storage compartment 115a, 115b, by a similar operation of the elevator 120, the longitudinal transfer mechanism including the carriage 122, and if necessary the transverse transfer mechanism including the transverse transfer members 125, 126 (FIGS. 6 and 7).

Figure 16:
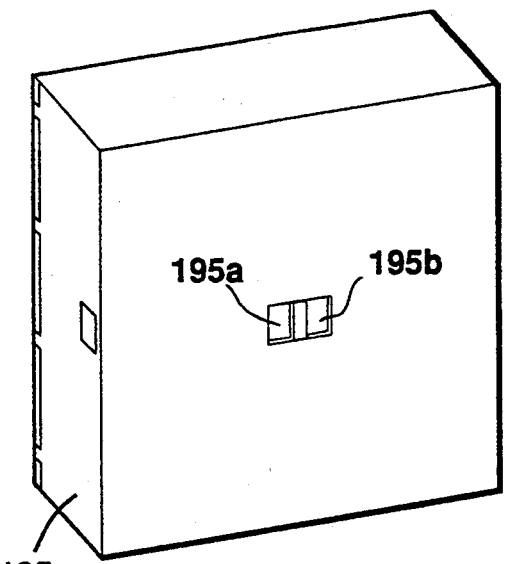
FIGS. 16, 16a and 17, 17a illustrate other types of article holders that may be accommodated in the cabin construction of the present invention.
Figure 16A:
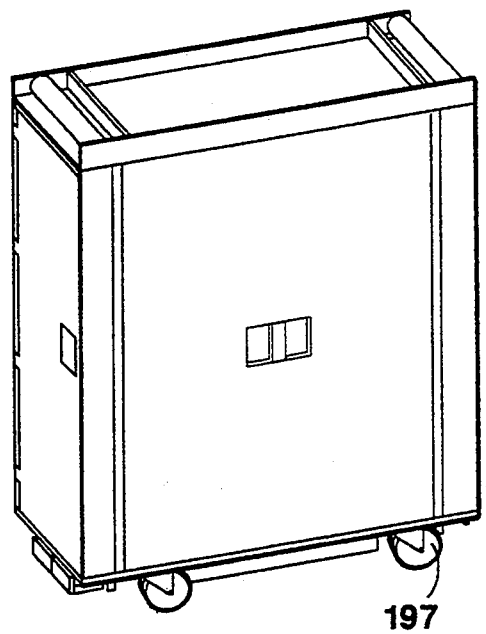
Figure 17:
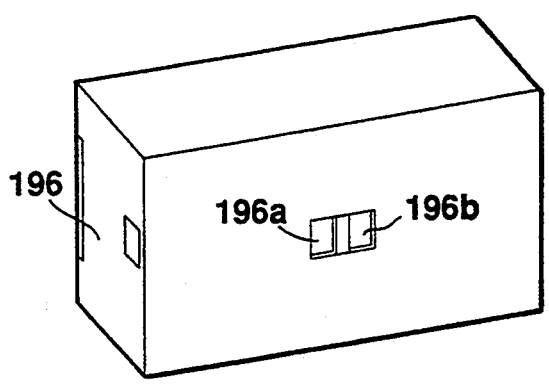
Figure 17A:
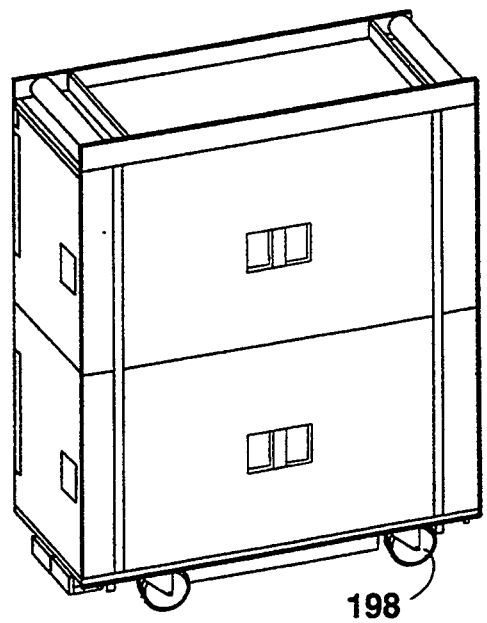

Thus, FIGS. 16 and 17 illustrate food containers, 195 and 196 respectively, of the general type described in the system of our Israel patent application Ser. No. 96799. Such containers include openings 195a, 195b and 196a, 196b, respectively, corresponding to openings 157 and 158 (FIG. 8) for cooperation with the cam locking devices 160 when transferring the containers either longitudinally or transversely with respect to the storage compartments. Such containers would not include wheels nor carriers (118) since they would be transferred by the transfer roller members 131, 132 in the bottom floors of the storage compartments as described above. However, when the containers are lowered to the deck for serving the food, they could be received in an empty wheeled cart, as shown at 197 and 198 in FIGS. 16a and 17a, respectively, movable along the aisles for distributing the food, or for handling cargo where the containers are used for cargo. Such carts need include only a frame, wheels and handles. Such food containers are particularly suitable for storage between the ceiling and outer fuselage where there is insufficient space for conventional carts.

Figure 18:
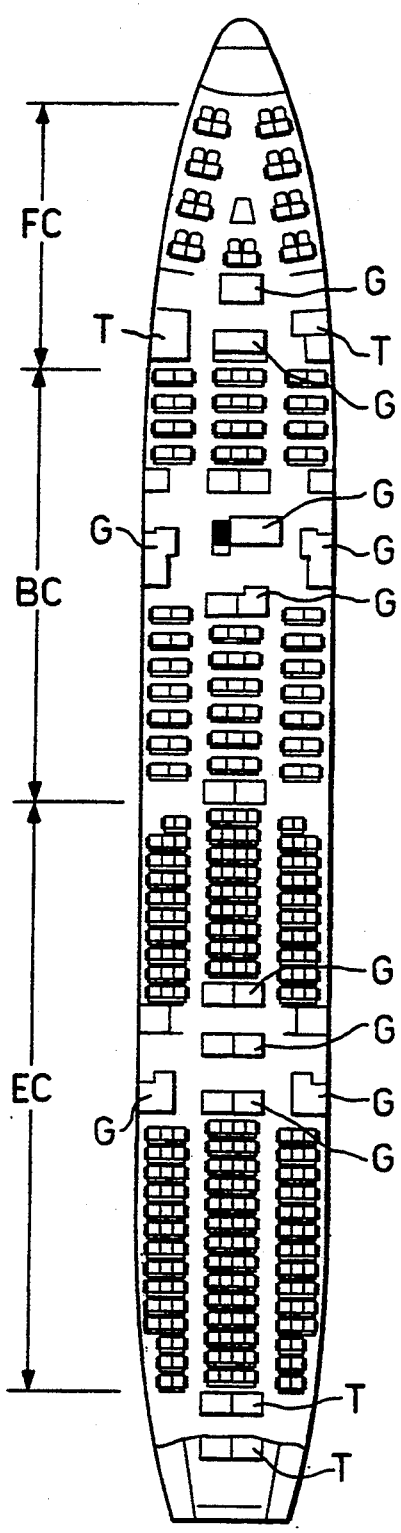
FIG. 18 illustrates a typical main deck seating arrangement in the present B-747/400.

In FIG. 18 (and also in FIG. 19), the galley units are each identified as G, the toilet units are each identified as T, and the lift units are identified as L.

FIG. 18 illustrates a main deck seating arrangement in the present B-747/400. Thus, in a typical existing arrangement, rows 1-12 are allocated as the first class FC; rows 13-27 are allocated as business class BC; and rows 28-53 are allocated as economy class EC. In such an arrangement, there is a first group of galleys G at the back of the first class FC, a second group of galleys G in the middle of the business class BC, and a third group of galleys G in the middle of the economy class EC. Each group includes a plurality of galley units.

It will thus be seen that the existing typical arrangement illustrated in FIG. 18 not only requires a relatively large number of galley units G, but also has a relatively poor distribution of such units. This is particularly true in the economy class EC where all the galley units are located in the middle of that class, and none is provided at the end. This makes it especially difficult to serve the food and to collect the trash with respect to rows 40-53 of the economy class EC.

Figure 19:
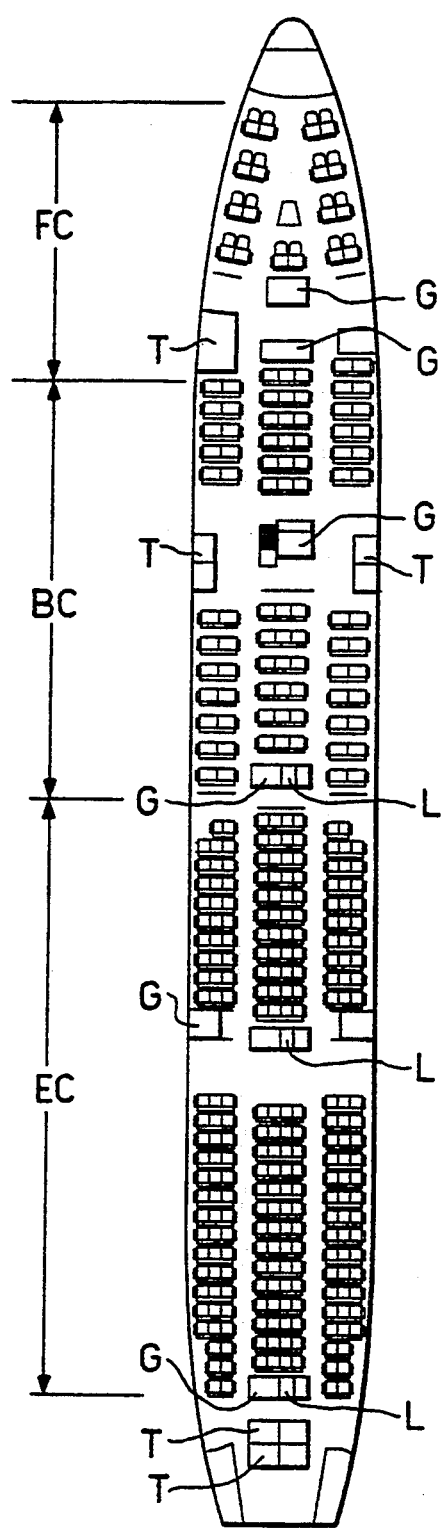
FIG. 19 illustrates how the main deck seating arrangement may be modified when incorporating the present invention.

In the improved arrangement illustrated in FIG. 19, the galley units are identified as G and the toilet units as T. Each galley unit G in the business class BC and in the economy class EC includes a lift L. This arrangement includes a smaller number of galley units, but the galley units are distributed in five groups, rather than in three groups. Thus, the galley units G in the first class FC are the same as in FIG. 18; but in the business class BC and in the economy class EC there is a galley unit G in the middle of the respective class and also at the end of the respective class. This greatly facilitates the distribution of the food and the collection of the trash particularly with respect to rows 40-53 in the economy class.

Figure 20:
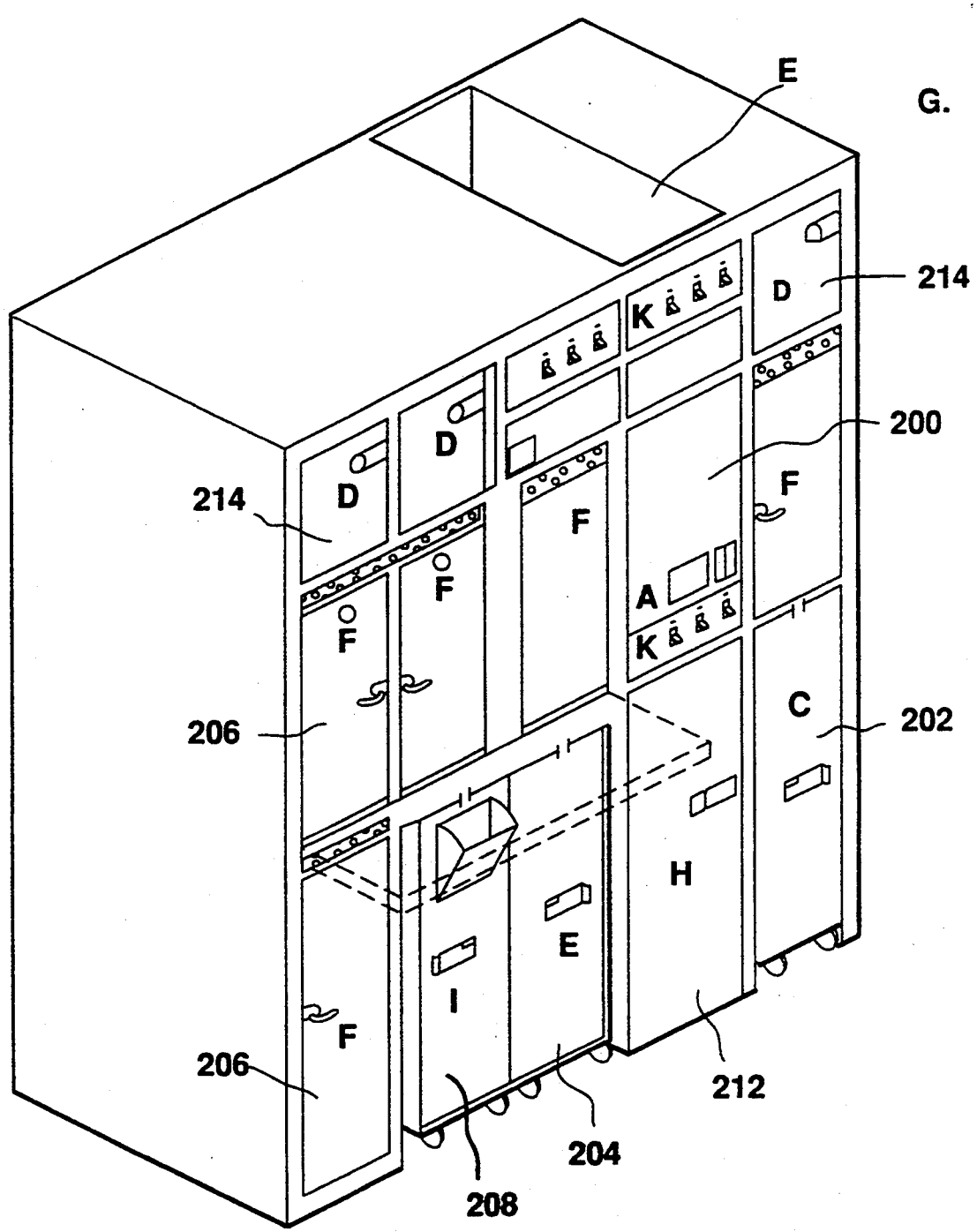
FIG. 20 illustrates a typical galley unit as may be used in the deck seating arrangement of FIG. 19.

FIG. 20 illustrates a typical galley unit as may be included in the seating arrangement of FIG. 19. Such a unit includes an elevator E, corresponding to elevator 120 in FIG. 14 for example. Each galley unit G further includes a terminal and monitor 200, a meal cart 202, a beverage cart 204, an oven/refrigerator 206, a waste trolley 208, and an electric control panel 210. The terminal and monitor 200 covers the upper part of the elevator shaft, and a door 212 covers the lower part. The galley may include other standard units, indicated at 214.

While the invention has been described with respect to one preferred embodiment, it will be appreciated that many variations may be made. For example, the storage compartments 115a, 115b may be used for storing and handling other types of article holders, such as food containers or cargo containers. The invention may also be embodied in other types of passenger vehicles, such as in buses or trains. Many other variations, modifications and applications of the invention will be apparent.

What is claimed is:

1. A vehicle cabin construction comprising:
   an outer fuselage wall;
   a deck therebelow;
   a plurality of passenger seats fixed to the deck and accessible by at least one longitudinally-extending main aisle;
   a ceiling overlying said seats and aisle and spaced from the outer vehicle wall;
   a storage compartment in the space between said ceiling and outer cabin wall extending longitudinally of the vehicle cabin for storing article holders;
   an elevator for lowering the article holders from said storage compartment to the deck, and for raising the article holders from the deck to the storage department;
   said compartment including a bottom wall rotatably mounting a plurality of roller transfer members such that said members project outwardly from the upper surface of said bottom wall so as to rotatably engage the article holders when received within said storage compartment;
   and longitudinal transfer means engageable with said article holders for moving them longitudinally from or to different locations in said storage compartment on said plurality of roller transfer members;
   said longitudinal transfer means including a carried having a longitudinal drive, a coupling device carried by said carriage and movable longitudinally therewith, and a coupling actuator for actuating said coupling device either to a coupling position or to a release position with respect to an article holder with which the coupling device is aligned.

2. The cabin construction according to claim 1, wherein said storage compartment is in a framework having a center section defining two storage compartments for accommodating two longitudinal lines of article holders, and a side section on each of the outer sides of said center section; there being one of said longitudinal transfer means in each of said side sections for transferring the article holders longitudinally of the respective storage compartment; said cabin construction further including transverse transfer means for transferring the article holders from one storage compartment to the other.

3. The cabin construction according to claim 2, wherein said roller transfers members include cylindrical rollers at the location of said longitudinal transfer means permitting the article holders to be moved longitudinally of the respective storage compartment, and spherical rollers at the location of said transverse transfer means permitting the article holders to be moved transversely from one storage compartment to the other.

4. The cabin construction according to claim 2, wherein each of said longitudinal transfer means includes a carriage having a longitudinal drive, a coupling device carried by said carriage and movable longitudinally therewith, and a coupling actuator for actuating said coupling device either to a coupling position or to a release position with respect to an article holder with which the coupling device is aligned.

5. The cabin construction according to claim 4, wherein each of said storage compartments includes a plurality of stops spaced along its length such as to provide a pair of stops on opposite sides of each article holder in said storage compartment; each of said stops including biasing means normally biassing the respective stop to an operative position engageable with an end of the article holder; and individual actuator means each actuated by said carriage to move the respective stop to a retracted position out of alignment with the end of the respective article holder.

6. The cabin construction according to claim 5, wherein said individual actuator means is effective to couple an article holder to the carriage before moving the stop for the article holder to its retracted position, and to move the stop to its operative position before decoupling the article holder from the carriage.

7. The cabin construction according to claim 5, wherein said carriage includes an actuator bar movable to an upper inoperative positive, or to a lower operative position; said individual actuator means of each stop being engageable by said actuator bar when in its lower operative position to move the respective stop to said retracted position.

8. The cabin construction according to claim 7, wherein said actuator bar has cam surfaces at its opposite ends effective, when the actuator bar is in its lowered position, to successively engage the individual actuator means of the stops, and thereby to lower the stops along the storage compartment in the direction in which the carriage is driven.

9. The cabin construction according to claim 7, wherein said actuator bar is dimensioned such that when it engages the individual actuator means of the stop on the side of an article holder to be longitudinally conveyed, and in the direction in which it is to be conveyed, it does not engage the stop on the opposite side of the same article holder.

10. The cabin construction according to claim 4, wherein said coupling device is in the form of a rotary cam which is rotated by said coupling actuator either to a projecting, coupling position projecting into an opening in the article holder with which it is aligned, or to a retracted, released position with respect to the article holder with which it is aligned.

11. The cabin construction according to claim 8, wherein the article holders are each formed with a first opening facing one side of the article holder, and a second opening facing the opposite side of the article holder; said rotary cam being receivable in the opening facing the direction in which the article holder is to be longitudinally conveyed.

12. The cabin construction according to claim 7, further including a common actuator means for actuating a plurality of said stops simultaneously to either their operative positions or to their retracted positions.

13. The cabin construction according to claim 12, wherein said common actuator means comprises:
a rack extending longitudinally of each storage compartment and cooperable with a gear for, and coupled to, each of said stops;
said rack including a toothed section and an untoothed section for each of said gears;
each of said toothed sections being meshable with the gear of its respective stop to move the gear and its respective stop to its operative position when the rack is moved in one direction, or to its retracted position when the rack is moved in the opposite direction, and to secure said stops in their operative positions;
each of said untoothed sections being alignable with said gears when the rack is moved to a releasing position, to thereby release said plurality of stops for actuation by each of said individual actuator means.

14. The cabin construction according to claim 10, wherein said individual actuator means comprises a further rack for each stop and meshable with a further gear for each stop to move the respective stop to its retracted position when said further stop is actuated by said carriage and said first-mentioned gear of the respective stop is aligned with an untoothed section of said first-mentioned rack.

15. The cabin construction according to claim 13, wherein each of said stops has an upper section engageable with the respective article holder when the stop is in its operative position by said biasing means, and a thicker base section having inclined sides engageable with the respective article holder when the stop is moved to its operative position by said common actuator means.

16. The cabin construction according to claim 2, wherein said transverse transfer means comprises transfer members at the upper and lower ends of the two storage compartments and extending longitudinally thereof for a distance no greater than the length of an article holder, and a drive for driving said pair of transfer members transversely of the storage compartments.

17. The cabin construction according to claim 16, wherein there are a plurality of said pairs of transfer members spaced longitudinally of the two storage compartments.

18. The cabin construction according to claim 1, wherein there are a plurality of elevators spaced longitudinally of the storage compartment.

19. The cabin construction according to claim 1, in combination with a plurality of article holders each including a flat bottom wall mounted on said roller transfer members of the storage compartment for transfer in the storage compartment.

20. The combination according to claim 19, wherein each of said article holders is formed with two openings for selectively receiving a coupling member carried by said longitudinal transfer means for transferring the article holder in the storage compartment.

21. The cabin construction according to claim 1, wherein the fuselage wall includes a cabin door at the level of the storage compartment and a transverse conveyor extending from the storage compartment to the door.

* * * * *